Patented Apr. 23, 1935

1,999,024

UNITED STATES PATENT OFFICE 1,999,024

MANUFACTURE OF RUBBER ARTICLES

Sherman I. Strickhouser, Providence, R. I., assignor, by mesne assignments, to United States Rubber Company, New York, N. Y., a corporation of New Jersey No Drawing. Application February 10, 1934, Serial No. 710,733

2 Claims. (Cl. 18—58)

This invention relates to the manufacture of rubber articles from latex, and more particularly to the production of crinkled surfaces on such articles.

In the preparation of rubber articles from latex by form-dipping processes, it has been proposed to provide a wrinkled surface on the latex film by drying the outer surface of the latex film after a dipping operation while retaining the underneath layer of the latex film in a still uncoagulated condition, in order to produce a crinkling or wrinkling effect of the outer coagulated skin, whereupon the underneath layers are substantially completely coagulated by continuing the drying process. In a similar manner a wrinkled surface has been obtained by dipping a form coated with latex into a bath containing a swelling agent, such as benzene mixed with a latex coagulant such as glacial acetic acid. The first of such processes is uneconomical by virtue of the necessity for careful control of the drying steps, while the second process utilizes a large amount of expensive reagents and has an increased fire hazard.

According to the present invention, a crinkled effect is provided on the surface of a latex dipped article by an easily controlled process and one which uses an inexpensive reagent and has a reduced fire hazard. The latex film may be applied to the form by a dipping, spraying, spreading or the like method, and if desired, several layers of latex coagulum may be built up by alternate dipping and drying or dipping and coagulating methods providing always that there is a final outer coating of uncoagulated latex on the form to be treated according to the present invention to provide a wrinkled effect on the surface of the final article. The form, of course, may be a permanent part or base of the rubber article, or the finished rubber film, preferably after vulcanization, may be stripped from the deposition surface of the form as is well known.

In carrying out the present invention, the form having the coating of latex applied thereto in any convenient manner is dipped into a latex coagulant in an aqueous medium through a thin layer of swelling agent floating on the surface of the coagulant bath and substantially immiscible with the bath so that the form is completely immersed in the subnatant latex coagulant. As the form surfaced with latex is dipped into the coagulant bath, it goes through the thin layer of swelling agent floating on top of the bath and when the coagulant underneath acts to coagulate the latex on the surface of the form, a wrinkled surface is produced. The form may remain in the coagulant until the coagulant has sufficiently penetrated the latex to complete the coagulation of the same, after which the form is removed from the coagulant bath out of contact with the swelling agent through which it passes, and dried. The coagulating agent may be an aqueous solution of an acid coagulant, such as 25% aqueous solution of acetic acid or an aqueous solution of other well known acid coagulants, or it may be an aqueous solution of di- or tri-valent metal salts, which are well known latex coagulants. The swelling agent may be any of the common rubber solvents, such as benzene, carbon disulphide, chloroform, or carbon tetrachloride, or mixtures of the same, as well as other less common solvents such as toluene, xylene, tetrahydronaphthalene, tetrachlorethane, or other active or strong swelling agents as for example those listed in the International Critical Tables, Vol. II, page 271.

In the following example of carrying out the invention, which is intended to be non-limiting and merely illustrative thereof, a latex compound as follows was used, it being obvious, however, that various compounded latices might be substituted therefor, as desired:

| | |
|---|---|
| Rubber as creamed latex 59.75% concentration | 100.00 |
| Water in creamed latex | 67.40 |
| Stabilizer | 1.25 |
| Formaldehyde (40% formalin) | 4.75 |
| Sulphur | 2.50 |
| Glue | 0.10 |
| Zinc oxide | 1.00 |
| Antioxidant | 0.35 |
| Sodium silicate | 0.50 |
| Accelerator | 2.00 |

Glazed porcelain forms commonly used in the preparation of dipped gloves were first dipped in the above latex compound, withdrawn, dipped in a plain coagulating bath comprising a 25% aqueous solution of acetic acid, allowed to dry partially in the air, dipped again into the latex compound, and then dipped into another 25% aqueous solution of acetic acid on the top of which was floated about a quarter of an inch of solvent naphtha. The forms were removed from this final coagulant bath on the surface of which was floated the swelling agent, air dried, and then cured for 15 minutes in water at 185–190° F. The two-dip process above described gave an article having a thickness of .012 to .015 inch but it is obvious that a single dip method might be utilized to give a thinner article or a large number of alternate dips in latex and a plain coagulant may be utilized prior to the final dip into latex and then into the coagulant on the surface of which floats the swelling agent, to provide articles having the desired thickness. Various thicknesses of swelling agent may be used but a thickness of from one eighth to one quarter of an inch has been found satisfactory. The fineness of crinkling can be controlled by the depth of the layer of supernatant immiscible swelling agent, by the relative solvent or swelling power of the agent, by the rate of immersion into the coagulating bath through the layer of swelling agent, and by the acidity or coagulating ability of the sub-layer of coagulant material. If desired, of course, each coagulant bath prior to the final one may have a thin film of swelling agent floating on it. While the foregoing example is illustrative of the present invention as applied to a rigid dipping form, it is possible and entirely practical to substitute semi-rigid forms of flexible backings, such as fabric, leather, etc. for these rigid forms. In these instances, the latex coating may be applied as for example on a fabric backing, by dipping, spreading or spraying processes, or a combination of the same as known in the art, followed by a coagulation by immersing the same into an aqueous solution of a coagulant through a thin film of swelling agent floating on the surface of the same in order to produce the desired wrinkled effect. The term "form" as used herein is intended to include such other forms and backings as well as rigid porous and non-porous forms, and whether such become a permanent part or base of the rubber article or the rubber article is removed therefrom.

The term "latex" in the description and claims is used to designate broadly coagulable dispersions of elastic materials, including artificial dispersions of rubber or rubber-like materials as well as natural latex, which may be preserved or compounded or otherwise treated as desired and which may be in a normal, diluted, concentrated or purified condition produced by methods well known in the art.

With the above detailed disclosure of the invention, it is evident that numerous modifications will suggest themselves to those skilled in the art, and it is not desired to limit the invention otherwise than required by the state of the art and as set forth in the appended claims.

Having thus described my invention, what I claim and desire to protect by Letters Patent is:

1. The process of manufacturing a dipped rubber article having a wrinkled surface comprising applying a coating of latex on the surface of a form, coagulating the latex on the surface of the form by dipping the thus treated form into a bath of latex coagulant in an aqueous medium on the surface of which bath is a thin layer of swelling agent substantially immiscible in and of less specific gravity than the coagulant bath, and removing the form from the coagulant bath and out of contact with the swelling agent.

2. The process of manufacturing a dipped rubber article having a wrinkled surface comprising applying a coating of latex on the surface of a form, dipping the thus treated form into a bath of latex coagulant in an aqueous medium through a thin layer of swelling agent floating on the surface of the bath and substantially immiscible therewith and completely immersing the form in the subnatant latex coagulant, removing the form from the coagulant bath and out of contact with the swelling agent, and drying.

SHERMAN I. STRICKHOUSER.